(12) United States Patent
Luce

(10) Patent No.: US 11,484,012 B2
(45) Date of Patent: Nov. 1, 2022

(54) METHOD AND SYSTEM FOR OPERATING AN APPARATUS THROUGH MULTIPLE INPUT AND OUTPUT DEVICES COUPLED WITH A MICROPROCESSOR

(71) Applicant: Presidio Studios Inc., Alderson, WV (US)

(72) Inventor: Timothy Luce, Alderson, WV (US)

( * ) Notice: Subject to any disclaimer, the term of this patent is extended or adjusted under 35 U.S.C. 154(b) by 296 days.

(21) Appl. No.: 16/827,005

(22) Filed: Mar. 23, 2020

(65) Prior Publication Data

US 2020/0296938 A1    Sep. 24, 2020

Related U.S. Application Data

(60) Provisional application No. 62/822,083, filed on Mar. 22, 2019.

(51) Int. Cl.
| | | |
|---|---|---|
| *A01K 31/02* | (2006.01) | |
| *E05F 15/665* | (2015.01) | |
| *G05B 15/02* | (2006.01) | |

(52) U.S. Cl.
CPC ............ *A01K 31/02* (2013.01); *E05F 15/665* (2015.01); *G05B 15/02* (2013.01); *E05Y 2400/32* (2013.01); *E05Y 2400/44* (2013.01); *E05Y 2400/664* (2013.01); *G05B 2219/163* (2013.01)

(58) Field of Classification Search
CPC ................................. A01K 31/02; A01K 31/18
See application file for complete search history.

(56) References Cited

U.S. PATENT DOCUMENTS

| | | | |
|---|---|---|---|
| 4,942,348 A * | 7/1990 | Nilssen | H01H 43/04 |
| | | | 137/553 |
| 5,359,576 A | 10/1994 | Bunner et al. | |
| 6,297,739 B1 | 10/2001 | Small | |
| 7,996,231 B2 | 8/2011 | Mays | |
| 8,020,519 B2 | 9/2011 | Stamper | |
| 8,401,860 B1 | 3/2013 | Evans | |
| 8,558,687 B2 | 10/2013 | Haupt et al. | |
| 8,947,203 B2 | 2/2015 | Kolar | |
| 9,157,269 B2 | 10/2015 | Brown | |
| 9,677,326 B2 | 6/2017 | Kodat | |
| 9,775,329 B1 * | 10/2017 | Miller | A01K 31/02 |

(Continued)

FOREIGN PATENT DOCUMENTS

CN           102524088 A       7/2012

*Primary Examiner* — Vincent H Tran
(74) *Attorney, Agent, or Firm* — Dinsmore & Shohl LLP; Monika L. Jaensson, Esq.

(57) ABSTRACT

A system and method for controlling movement of a door or other apparatus, such as to provide and restrict access to a chicken coop, including a plurality of input devices, a plurality of output devices, and a microprocessor configured on a circuit board to detect signals from the input devices, process the signals, and based upon predetermined logic generate and transmit output signals to the output devices. One of the input devices is a wireless smart switch remotely controlled by a user, which transmits electric current based upon user input such that when the user input indicates an intention that the apparatus move in a first direction, the switch will transmit electric current, and when the user input indicates an intention that the apparatus move in a second direction, the switch will stop transmitting electric current.

20 Claims, 6 Drawing Sheets

(56) References Cited

U.S. PATENT DOCUMENTS

| | | |
|---|---|---|
| 2003/0221631 A1 | 12/2003 | Yarbrough |
| 2006/0139453 A1* | 6/2006 | Spinelli .................. H04N 7/186 |
| | | 348/E7.087 |
| 2007/0126288 A1* | 6/2007 | McDonough .......... H05B 47/10 |
| | | 307/115 |
| 2007/0234643 A1 | 10/2007 | Siegal et al. |
| 2010/0102512 A1 | 4/2010 | Dar |
| 2010/0262293 A1* | 10/2010 | Byberg .................... E06B 9/68 |
| | | 700/275 |
| 2011/0113692 A1* | 5/2011 | Stamper ................ E05F 15/614 |
| | | 340/5.1 |
| 2011/0241567 A1* | 10/2011 | Covaro ............. H05B 41/3927 |
| | | 315/297 |
| 2012/0067594 A1* | 3/2012 | Noske .................. E21B 34/063 |
| | | 166/373 |
| 2018/0128043 A1 | 5/2018 | Liu |
| 2019/0012497 A1* | 1/2019 | Ralston ................ A01K 11/006 |
| 2019/0098874 A1* | 4/2019 | Burton ................. A01K 29/005 |
| 2019/0254260 A1* | 8/2019 | Nguyen ................... G07C 9/30 |
| 2021/0000080 A1* | 1/2021 | Tuthill .................. E05F 15/635 |
| 2021/0123283 A1* | 4/2021 | Sutterer ................... A01K 1/08 |

* cited by examiner

METHOD AND SYSTEM FOR OPERATING AN APPARATUS THROUGH MULTIPLE INPUT AND OUTPUT DEVICES COUPLED WITH A MICROPROCESSOR

BACKGROUND

The disclosed technology regards a novel system and method for controlling movement of a door or other apparatus, such as to provide and restrict access to a chicken coop, including a plurality of input devices, a plurality of output devices, and a microprocessor configured on a circuit board to detect signals from the input devices, process the signals, and based upon predetermined logic generate and transmit output signals to the output devices.

GENERAL DESCRIPTION

In general, the disclosed technology regards a circuit which is modular in design in that it can accept inputs from various sources simultaneously (human voice via Amazon Alexa/Google Home, environmental sensors, human input via switches, and other input sources) and control output signals and apparatuses based on logic and variables, which can be customized in software or logic included in a microprocessor.

By the disclosed technology, a variety of devices may be controlled through multiple input devices. Examples include chicken coop doors, skeet traps for throwing clay pigeons in skeet shooting, remote start of vehicles, other access control for humans and animals, workshop tools, accessibility devices for people with special needs, pet feeders, and agricultural feeders. Virtually any device which can be controlled with a switch or relay can be controlled via the disclosed technology.

In one embodiment, the disclosed technology is integrated with a chicken door, to create an automated chicken door that maximizes foraging time and egg production, and reduces opportunity for predation and man-hours for chicken care. Using the present technology, the chicken door can be opened or closed for example using voice command (Alexa, Google home, and others) and through the detection of sunlight. Using smart switches and the technology they offer, the door can be opened using a button or other programmable means on a remote application, on a calendar and time based schedule programmable on the application. Manual switches may be coupled with the disclosed technology, offering control opportunities through pressing a manual switch coupled with the circuit.

Based upon the disclosed technology, Pavlovian conditioning alerts may be integrated with the opening and closing of a door. For example, a sound, delivery of food, or other alert may be activated by the disclosed technology to alert an animal, for example, when the door is ready to open and before it closes so they will have a cue to come inside a pen or coop, or go outside.

Because the circuit of the disclosed technology is modular by design, and by means of its input array, future developments in technology may be used in addition to Alexa, Google Home and similar voice recognition technology.

The circuit may be battery powered, solar-battery powered, or may be plugged into an electrical outlet.

The disclosed technology provides and includes a system for controlling movement of a door to provide and restrict access to a chicken coop. In this configuration, the system includes a plurality of input devices, a plurality of output devices, and a microprocessor configured on a circuit board to detect signals from the input devices, process the signals, and based upon predetermined logic generate and transmit output signals to the output devices. For purposes of this disclosure, "signals" can include presence or absence of electrical current, polarized current, changing voltage, frequency, and amperage in current, and all other types of electrical signals.

One of the plurality of input devices may be a wireless smart switch remotely controlled by a user, which transmits electric current based upon user input such that when the user input indicates an intention that the door move in a first direction, the switch will transmit electric current, and when the user input indicates an intention that the door move in a second direction, the switch will stop transmitting electric current. Another of the input devices may be a sensor capable of sensing environmental light conditions and transmitting electric current defined by such light conditions. Another of the input devices may be a manual switch, which conducts electric current based upon the position of the switch. Other suitable input devices are herein described.

One of the output devices may be an actuator, coupled with the door of the chicken coop or another apparatus to cause the door to open or close, or the apparatus to move or operate, based upon output signals received from the microprocessor. Another of the output devices may be a light which is controlled based upon output signals received from the microprocessor. Another of the output devices may generate a sound based upon output signals received from the microprocessor. Other suitable output devices may be used in the system, as herein described.

One or more limit switches may be incorporated into the system to sense a position of the door to the chicken coop, for example, or the position of the apparatus, and to communicate the door position to the microprocessor for use by the microprocessor in determining what output signals, if any, to transmit to one or more of the output devices.

The disclosed technology also provides a circuit board for controlling multiple apparatuses designed and configured to receive signals from a plurality of input devices, and to be in communication with and direct or control a plurality of output devices. The circuit board includes a microprocessor to detect signals from the input devices, process the signals, and based upon predetermined logic generate and transmit output signals to the output devices useful in the operation thereof.

Input devices for this circuit board may include wireless smart switches, sensors capable of sensing and communicating an environmental condition, manual switches, and other input devices as herein described for this and other embodiments of the disclosed technology. Output devices for this circuit board may include an actuator coupled for example with an apparatus, to cause the apparatus to move based upon output signals received from the microprocessor; lights which respond to output signals from the microprocessor; devices that generate sounds as directed by output signals from the microprocessor; and other output devices as herein described for this and other embodiments of the disclosed technology. One or more limit switches may communicate the position of an apparatus to the microprocessor, which may be useful as the microprocessor determines which output signals to send to one or more of the output devices.

The disclosed technology further provides a method for controlling the position of a door or other apparatus and other signaling devices. The method includes providing a plurality of input devices designed to transmit signals and information to a microprocessor. Suitable input devices include a wireless smart switch, light or other sensors, and manual switches; other input devices are herein described for this and other inventions.

In this method, a plurality of output devices are also provided and coupled with the microprocessor, operating based upon output signals from the microprocessor. Suitable output devices include actuators, lights, and alert devices such as devices capable of generating sounds. Other output devices suitable for use with this method are herein described interchangeably among inventions.

In this method, the microprocessor processes signals it receives from the input devices, and through its predefined logic generates and transmits output signals to one or more of the output devices, causing operation of the same.

DETAILED DESCRIPTION

As shown in the embodiments depicted in the accompanying Figures, the disclosed technology generally includes a circuit board 5 designed and configured to receive input signals from a plurality of input devices 31, 32, 33. The input signals are received or detected by a microprocessor 51, which processes the input signals and sends output signals to multiple output devices 41, 42, 43, 44. Suitable output devices include an actuator 41, which based upon the signal received may operate to open or close a door, for example. Other output devices suitable for use with and control by the disclosed technology include lights 42 (which can be illuminated or not illuminated, at the direction of the microprocessor), devices capable of emitting sounds or aromas 43, devices capable of releasing food 44, and similar or other devices.

As shown through embodiments in the Figures, the disclosed system includes three or more input devices which receive instructions, sense conditions, or provide a manual user input, or any combination thereof, to generate, conduct, control, block or alter electrical input signals to the microprocessor. Examples of suitable input devices include wireless (e.g., Wi-Fi, cellular, Bluetooth, Z-wave, ZigBee, radio, etc.) smart switches 32, sensors such as light sensors 33, manual switches 31, limit switches, relays, or other switches. Other input devices capable of generating, conducting, controlling, blocking, or altering the properties of an electrical signal based upon information received, conditions sensed, or manual user input, would also be suitable for use with the system of the disclosed technology. Notably, the electrical signal may carry information for processing by the microprocessor by the mere presence or absence of electrical current, or through its polarity, voltage, amperage, frequency, or other properties of the electrical current transmitted within the system.

The input signals presented by the respective input devices are received by the microprocessor 51, which processes the input signals and generates one or more output signals which are transmitted within the system to any one or more output devices. As herein described, the output devices may include actuators 41, relays, lights 42 (e.g., LEDs), devices capable of emitting sounds or aromas 43 (e.g., piezoelectric buzzers), devices capable of releasing food 44, or other similar devices. The output signals generated and transmitted by the microprocessor may be determined by the plurality of input signals received or sensed by the microprocessor, as well as current conditions regarding the apparatus operated by the system of the disclosed technology. As an example, the output signal to operate an actuator 41 may be either a first signal to operate or instruct the actuator to operate in a first direction (e.g., open), or a second signal to operate or instruct the actuator to operate in a second direction (e.g., close). These or other signals may be generated by the microprocessor and communicated to any one or more output devices of the disclosed technology. For example, a single signal may be generated by the microprocessor and transmitted to multiple output devices, such as an actuator and an LED, causing both to operate in accordance with the signal. The first signal may be simply the presence of an electrical current, and the second signal may be the absence of an electrical current; alternatively, opposing polarities of the electrical current may define the first and second signals, respectively. Similarly, the signals generated by the microprocessor may include information using standard signal processing techniques. Some output devices may use the electrical current received as the signal from the microprocessor to operate the device; others may receive the signal and take action based thereon, drawing power from another source.

The actuator 41 may be an electric, pneumatic, mechanical, electromagnetic or hydraulic actuator. For example, as shown in FIGS. 1-4, a mechanical rotary actuator 41 may be coupled with a door 2, such as an animal or chicken coop door, to open or close the door as instructed through output signals from the microprocessor 51. The door 2 may run in a track 2A to hold it in place as the door is raised or lowered pursuant to the disclosed technology.

Wired and wireless smart switches 32 may be used as one or more input devices for the system of the disclosed technology, and can be controlled remotely from the system. Further, through this remote control they may provide highly flexible and intelligent operation of one or more of the input devices of this system. Presently available on the market is ITEAD's Sonoff wireless smart switch, which provides user control of the switch through a web-based interface, and also communicates with third party platforms such as Amazon Alexa and Google Home. Thereby, when a wireless smart switch is used as an input device in the system of the disclosed technology a user can easily control or program (at the web-based interface) the timing and properties of the input signals sent by the input device to the microprocessor. At the user interface the user may operate the wireless smart switch real-time or by setting single or repeating times in the future to operate the wireless smart switch (by date or day of the week, for example), or may use data, including third party data, to operate the wireless smart switch (for example, at sunrise and sunset in a particular geographic region based upon data from a third party provider), or combinations thereof. The signal generated by the wireless smart switch is received by a terminal on the circuit board. An opto-isolator detects the signal and relays it to the microprocessor 51.

As hereinabove described, sensors which sense conditions, such as for example light sensors 33 are also useful as input devices in the system of the disclosed technology. Suitable light sensors include photocells, such as photovoltaic cells and photoconductive cells. Some light sensors convert light energy of various wavelengths into electrical energy. Photocells communicate levels of light through resistance (which can be measured directly or through measurement of the voltage of the electrical current transmitted), wherein when little light is present, resistance is high; when daylight is present, resistance is low. The electrical energy is then transmitted to the circuit board 5 of the disclosed technology for measurement. The microprocessor measures the resistance, voltage or other property of the electrical signal received from the light sensor, registers a light condition based upon such property, and selectively generates an output signal based upon the light condition. In the exemplary embodiment shown in FIG. 4, this sensor 33 may be positioned on the exterior of the housing 1, to sense outdoor light. In other embodiments the sensor may be positioned remotely from the housing (or other device operated by the system of the disclosed technology), communicating with the microprocessor through wires or wirelessly with a wireless receiver coupled with the circuit board and the microprocessor.

In an exemplary embodiment, the microprocessor determines a light value, based upon its measurement of resistance, voltage or other property of the input signal from a light sensor, and compares it to a pre-determined maximum value. If the light value falls below a predefined lower threshold (e.g., 10% of maximum value) then the processor may generate a signal which is transmitted to the actuator, instructing it to activate in the reverse direction. If the processor determines that the light value rises above a predefined upper threshold (e.g., 20% of maximum value), the processor may transmit a signal to the actuator to activate in the forward direction. In this example, light levels detected between the predefined values of 10%-20% of maximum value are categorized as being in the hysteresis range, and the processor ignores these values and does not generate a signal to trigger action by the actuator until the light values are outside of this hysteresis range. By this configuration, the system avoids unwanted repetitive forward and reverse activation of the actuator due to anomalous fluctuations in light caused by incidental environmental conditions unrelated to trending light values (gradual increase or fall-off) as typically observed around periods of sunrise/sunset.

In some embodiments a bypass switch is engaged between the light sensor and the microprocessor, allowing a user to control whether electric current from the light sensor will be received and processed by the microprocessor. In this embodiment, when the bypass switch is on, the electrical current is blocked from the microprocessor; when the bypass switch is off, the electrical current is transmitted to the microprocessor. A suitable bypass switch for use with the disclosed technology includes a single pole switch capable of interrupting a circuit of approximately 5 volts. Bypass switches may also be incorporated between other input devices and the microprocessor.

In order to further control operation of the system of the disclosed technology, manual switches 31 may provide another input to the microprocessor. Suitable manual switches for use with the system of the disclosed technology include toggle or rocker switches, maintained or momentary contact, which allow a user to control the flow of electricity from the switch to the microprocessor, and for the microprocessor to determine the position of the switch based upon the flow (or absence) of electricity from the switch. In some embodiments the switch is a three position momentary switch in an ON-OFF-ON configuration that transmits an electrical current on a first wire when the switch is moved in a first direction, transmits an electrical current on a second wire when the switch is moved in a second direction, and upon release from either position returns to the off position, which does not conduct current on either wire.

Figure 1:
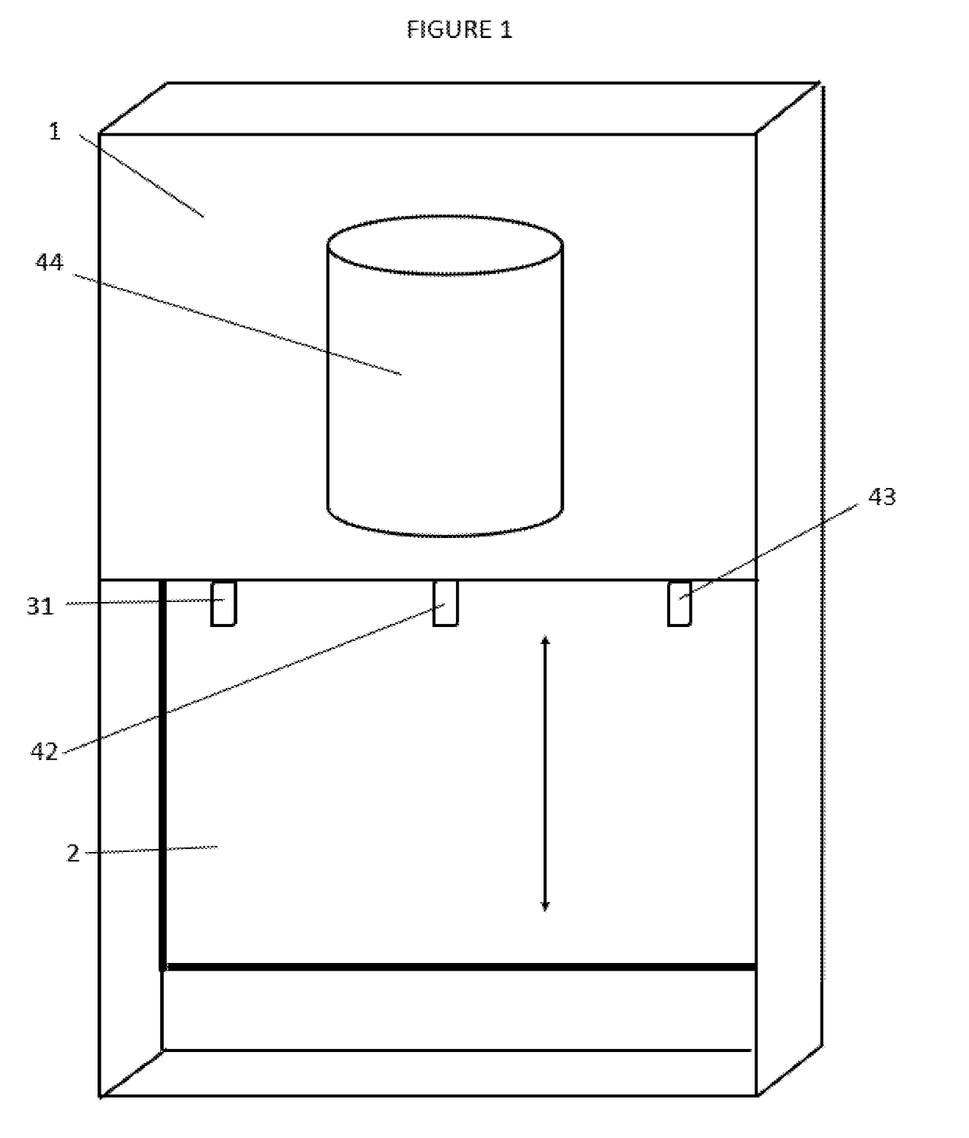
FIG. 1 is a front perspective view of an embodiment of a system of the disclosed technology, with the door partially open.

As hereinabove discussed, in the exemplary embodiment shown in FIGS. 1-4, a door to a chicken coop is provided with the technology herein described to control various output devices. In this embodiment, a housing 1 supports many of the components of the system. FIG. 1 shows the interior side of the housing, with a Pavlovian programmable feeder 44 positioned on the upper interior side of the housing. A light 42 and a device capable of making sounds 43, and a manual switch input device 31 are supported on the underside of a shelf of the housing. The door 2, which moves up and down as controlled by the system of the disclosed technology is positioned on a second end of the housing.

Figure 2:
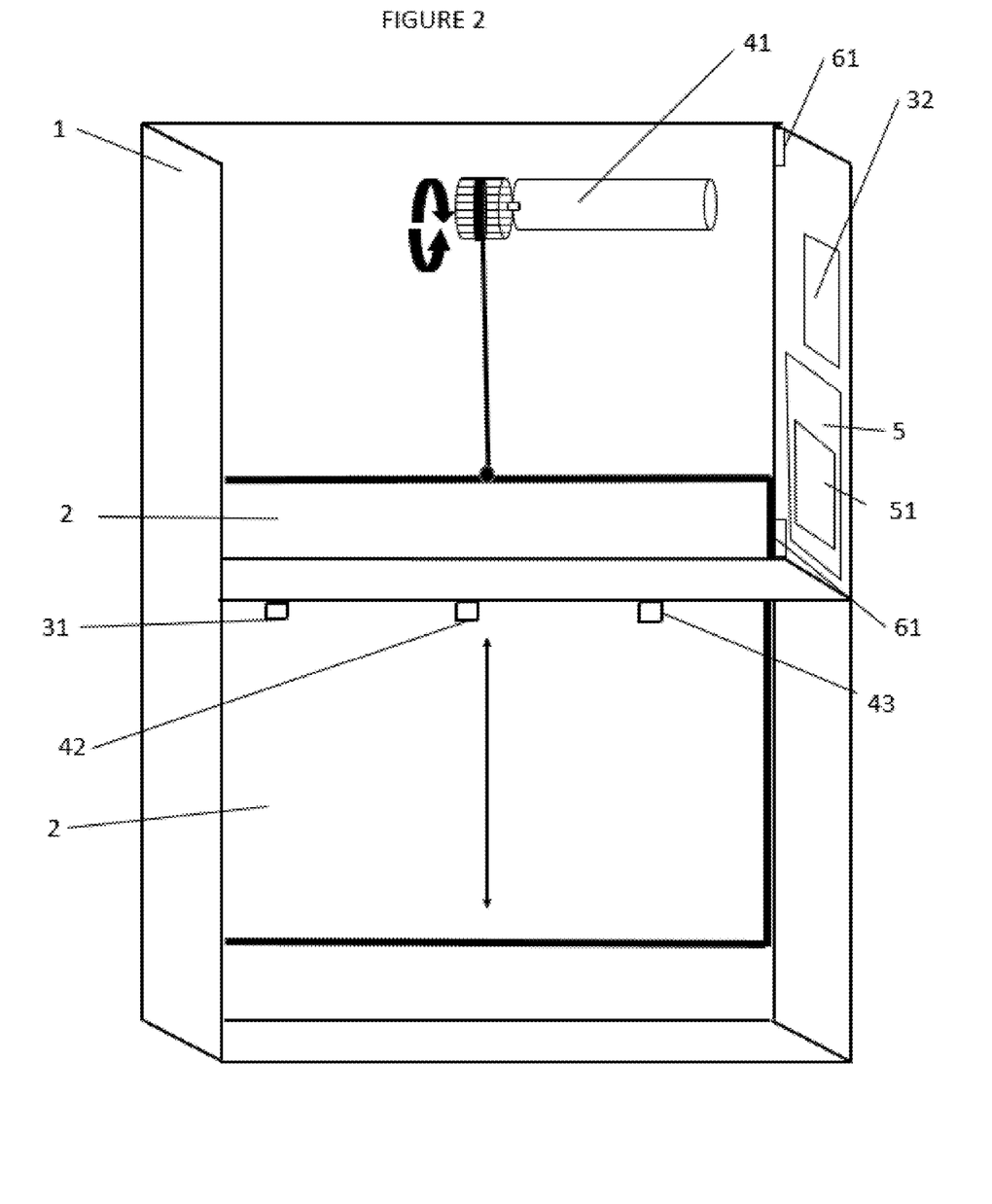
FIG. 2 is another front perspective view of the embodiment of FIG. 1, with the top cover of the housing removed to reveal components therein.
Figure 3:
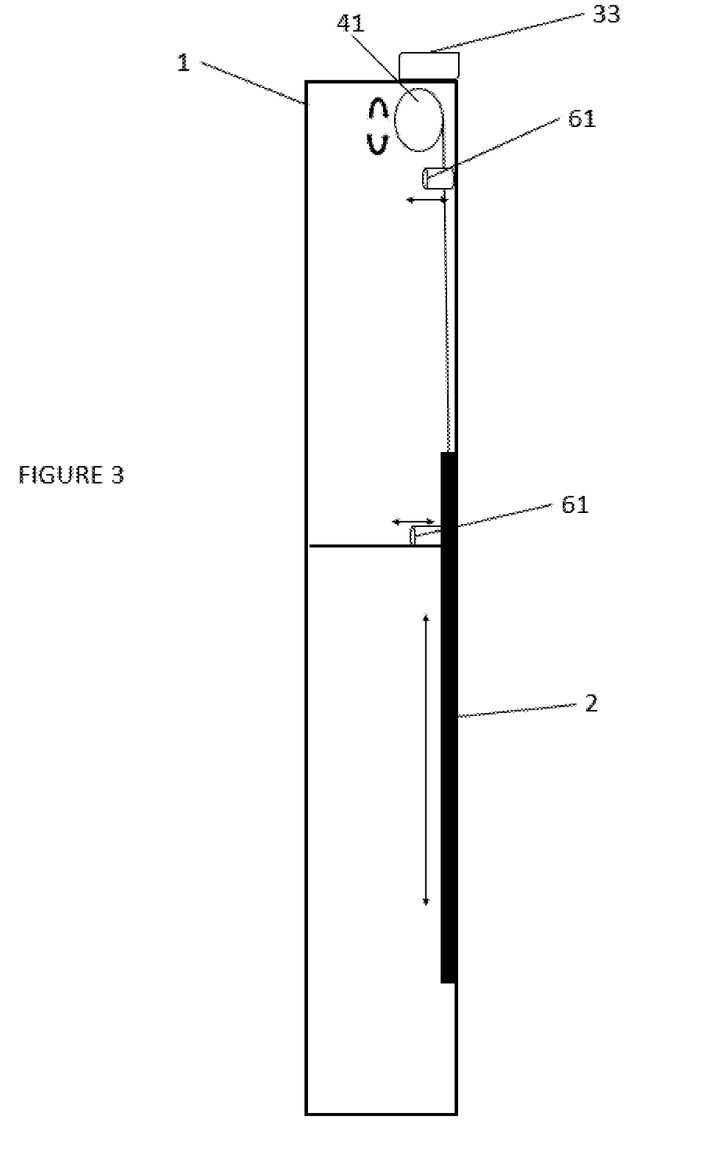
FIG. 3 is a side view of the embodiment of FIGS. 1 and 2, with the side of the housing removed to reveal components supported in the back of the housing.
Figure 4:
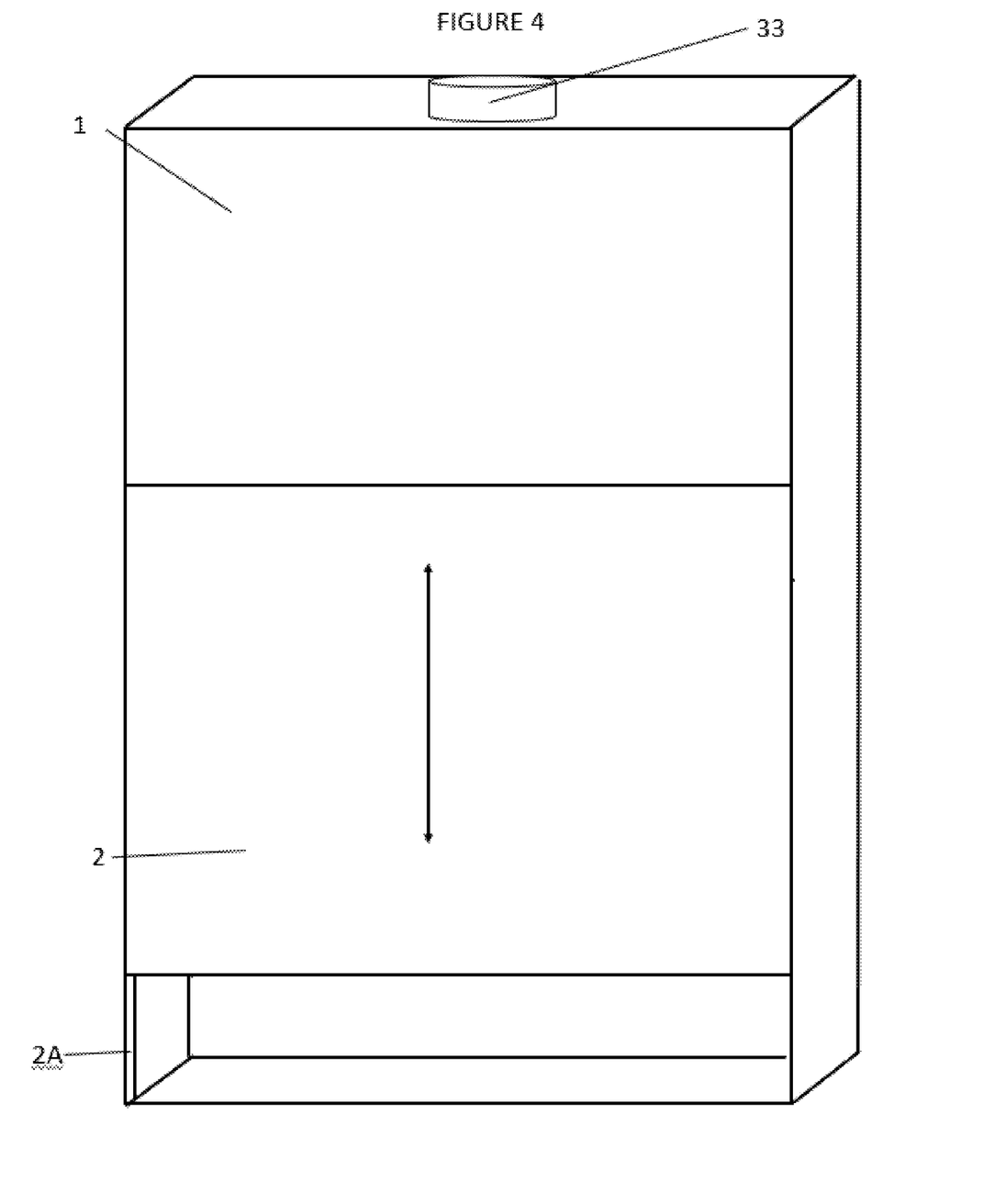
FIG. 4 is a rear view of the embodiment of FIGS. 1-3, with the door partially open.

FIG. 2 shows the same embodiment, with a cover of the housing removed, to show the circuit board 5, the microprocessor 51, limit switches 61, the actuator 41 as coupled with the door, and a smart switch 32. FIG. 3 is a side view of this embodiment of the disclosed technology, further showing the light sensor 33 positioned on the top of the housing 1. As shown, lower limit switch 61 is moved by the door, and with upper limit switch 61 communicates the position of the door to the microprocessor. FIG. 4 provides a view of the back of this embodiment of the disclosed technology.

Figure 5:
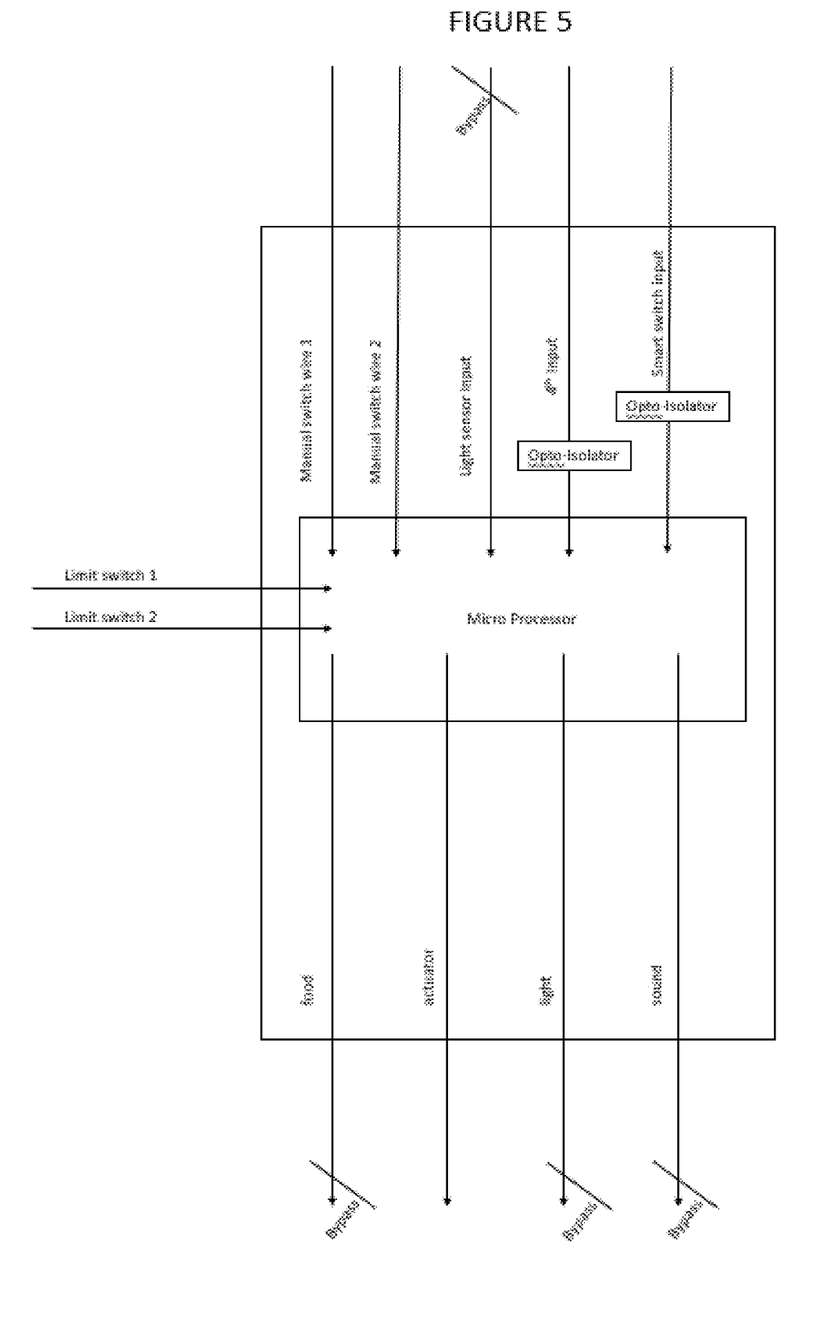
FIG. 5 depicts an embodiment of the circuit board of the disclosed technology.

In this embodiment, as shown in FIG. 5, the inputs to the system include a manual input, with two wires in communication with the circuit board, a light sensor, a smart switch, and an expansion port for a fourth input. The microprocessor controls four output devices, including a Pavlovian food dispenser, an actuator coupled with the door, a light and sound. The food, light and sound output devices and the light sensor input each have a bypass switch so that the user may disable any of these devices. Two limit switches are provided to communicate the position of the door to the microprocessor.

Figure 6:
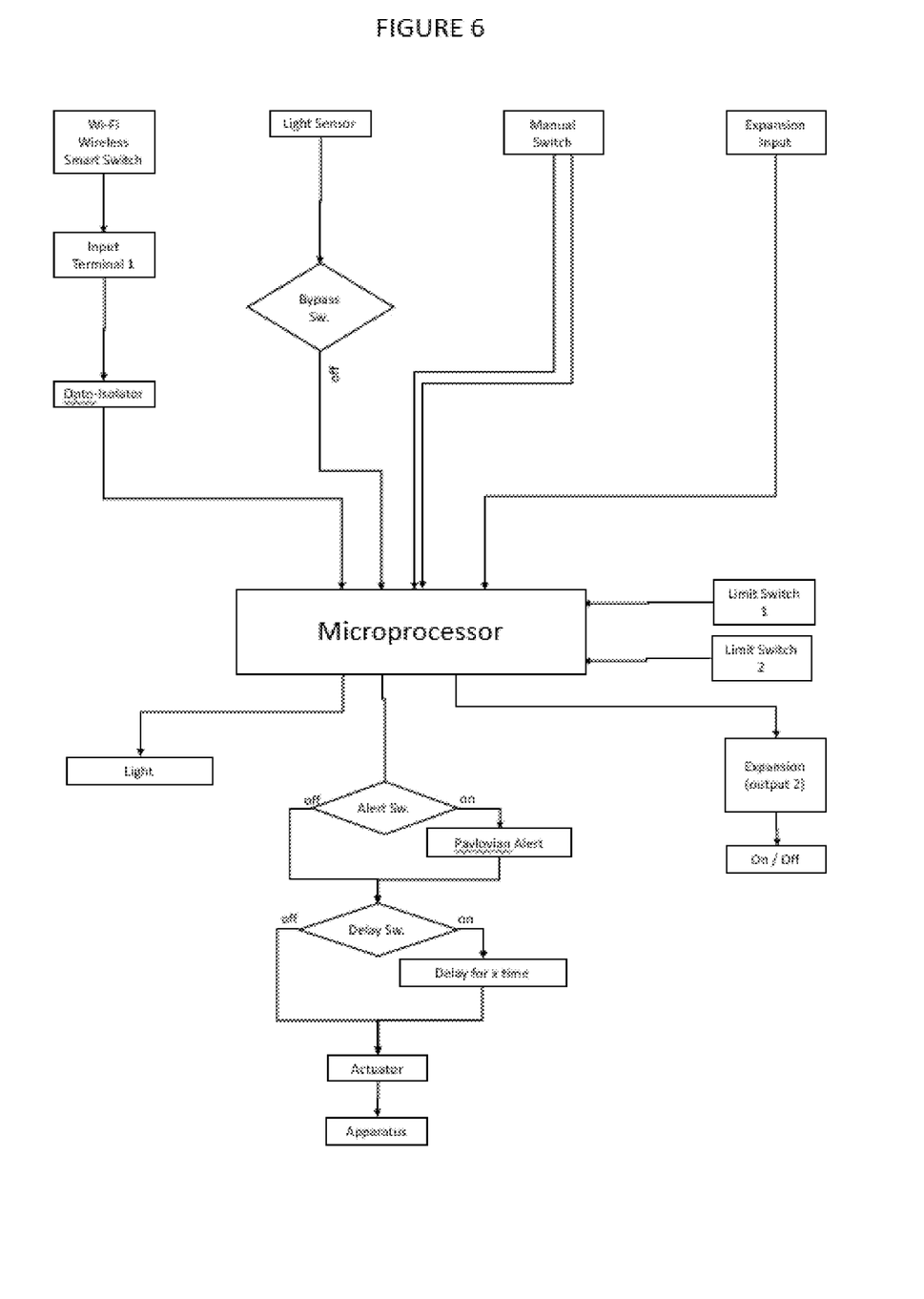
FIG. 6 is a flow chart of an embodiment of the disclosed technology.

Another diagram useful for understanding the flow of signals in this exemplary embodiment is shown in FIG. 6. In this embodiment, the microprocessor communicates directly with the light output device and a second expansion output device. Further, the microprocessor, upon intention to move the actuator, first sends the signal to an alert switch which, if on, generates a Pavlovian alert, such as sound or food, and transmits the signal to the actuator, which operates the apparatus (e.g., opens/closes the door). If on, a delay switch may delay the transmission of the signal to the actuator for period of time (x).

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

By this configuration the microprocessor receives signals from the plurality of input devices. In the embodiment shown in FIGS. 2, 5 and 6, for example, these input devices may include a Wi-Fi wireless smart switch 32, a light sensor 33, a manual switch 31, and a fourth input shown in FIG. 6, reserved for other types of smart, sensor, manual, limit, relays, or other switches. Upon a change in input signals (electrical energy) from any of the input devices, the microprocessor processes the signals and may generate and transmit a signal to any of the four output devices 41, 42, 43, 44 based upon predefined logic within the processor, as herein discussed. One such output signal transmitted to an actuator 41 may direct the actuator to move in a particular direction, while another signal may direct the actuator to move in the opposite direction. By this configuration, the microprocessor can direct the actuator to move a door up, for example, based upon a first output signal, and down based upon a second output signal.

As an example, if the actuator 41 is engaged with a chicken door 2 supported within a housing 1 to raise or lower the door upon direction from the microprocessor, the Wi-Fi wireless smart switch 32 may (upon instruction from the user interface or related programming, communicated wirelessly to the smart switch) generate an electrical current, and transmit the current to an input terminal on the circuit board. An opto-isolator detects the current and in such condition relays electrical current to the microprocessor 51. Upon receipt of electrical current from the opto-isolator, the microprocessor through its predefined logic may generate and send a first output signal to the actuator 41, instructing it to open the door. When the smart switch receives instruction to close the door, it ceases transmitting electrical current, and thus the opto-isolator ceases to transmit current to the microprocessor. When the microprocessor stops receiving current from the opto-isolator, through its predefined logic it may generate and send a second output signal to the actuator, instructing it to close the door. The first and second output signals may be differentiated by their polarity, or otherwise. The actuator may be powered directly by the circuitry of the disclosed technology, or the microprocessor may activate an external power source coupled with the actuator through relays, transistors or other similar devices.

Similarly, if from a state of sensing no light, the light sensor 33 senses light, it varies the resistance of electrical current flowing between the light sensor and the circuit board 5 and microprocessor 51. A Wheatstone bridge, for example, may determine the resistance over time in the current received from the light sensor, and communicate the same to the microprocessor. Alternatively, the microprocessor may detect the voltage of the current received to determine the light value and/or resistance. As hereinabove discussed, if the resistance is below a certain pre-determined threshold, the microprocessor may generate and transmit the first output signal to the actuator 41 to open the door. If the resistance is above a certain pre-determined threshold, the microprocessor may generate and transmit the second output signal to the actuator to close the door.

Likewise, if a momentary ON-OFF-ON manual switch 31 coupled with the circuit board 5 of the disclosed technology is moved from the off position in a first direction, it conducts electrical current through a first wire which is received by the microprocessor 51. The microprocessor then processes the signal, and based upon its predefined logic, may generate and transmit the first output signal to the actuator 41 to cause it to operate in the forward direction. When the manual switch returns to the off position, it no longer conducts current. When the switch is moved in a second direction, it conducts electrical current through a second wire which is received by the microprocessor. The microprocessor then processes this signal, and based upon its predefined logic, may generate and transmit a second output signal to the actuator to cause it to operate in the reverse direction.

Other input devices can likewise transmit signals to the microprocessor, which upon receipt may be processed by the microprocessor, and based upon its predefined logic may send the first or second output signal to the actuator to power or direct the actuator in the forward or reverse direction.

One or more limit switches 61 may detect current conditions (to be considered as the microprocessor processes the signals from the input devices) and communicate those conditions to the microprocessor 51. In an exemplary embodiment, a limit switch may be positioned on the door 2 or housing 1 to determine whether the door 2 is open. When it detects that the door is open, it communicates that position to the microprocessor. Through its predefined logic, if the microprocessor receives an input signal from an input device intended to open the door, and the corresponding limit switch detects that the door is already open, the input signal from the input device will be disregarded and the microprocessor will not send an output signal to the actuator to open the door. Likewise, if the microprocessor receives a signal from an input device intended to close the door, and the corresponding limit switch detects that the door is not open, the input signal will be disregarded and the microprocessor will not send an output signal to the actuator to close the door. By this configuration, the actuator 41 will never attempt to extend the position of the door 2 beyond its intended open or closed position. From a more general perspective, the microprocessor will disregard any signals from the input devices to open the door if the limit switch communicates to the microprocessor that the door is already open, and will disregard any signals from the input device to close the door if the limit switch communicates to the microprocessor that the door is not opened. In a similar embodiment, a second limit switch 61 may be used to detect the door closed position, and communicate the same to the microprocessor, in lieu of the "not open" condition of the first limit switch. Suitable limit switches for use with a door include momentary hinge roller lever micro switches affixed to the door or the door frame at one or more locations to sense the position of the door. Notably, the system of the disclosed technology can use limit switches in normally open or normally closed configuration, using a jumper on the circuit board to indicate the type of limit switch coupled with the system.

The actuator and other output devices can be preset to run for a specific time and/or at a specific speed, when opening or closing the door or otherwise operating an apparatus, based upon the design and configuration of the door or apparatus. Further, adjustable potentiometers configured on the circuit board may determine the speed and duration of the operation of certain output devices, for example the actuator, to direct the apparatus (door) to move at a specific speed and for a specific duration. In some configurations a separate motor may be used to operate the apparatus, wherein the microprocessor communicates with this separate motor. In this configuration the motor may be configured to receive momentary signals or sustained signals; a jumper pin can select the appropriate relay array on the circuit board based upon the configuration of the motor or other output device.

The output devices can be powered directly by the current from the on-board relay array (controlled by the microprocessor), or may employ a relay or other switching or isolating device to enable the output devices to be powered independently.

In some embodiments, a delay function can be activated within the microprocessor, to delay communicating the output signal for predefined time periods. In one exemplary embodiment, a delay could be set to 10 minutes after an input signal or change in input signal is received by the microprocessor. In another exemplary embodiment, the delay could be set to 60 minutes. In some embodiments where the output signal is being sent to multiple output devices, the delay may apply to some of these output signals, but not to others. For example, the delay may apply to the output signal being sent to the actuator, but not to the output signal being sent to a light or sound device. The delay may be activated or deactivated by a manual switch coupled with the apparatus. The delay time may be set by an adjustable potentiometer coupled with the microprocessor. Thereby, the door can open, for example, 15 minutes after sunrise is detected by the light sensor. When using delays, the processor may process the input signals sequentially, waiting to process a second signal until after the delay on the first signal is concluded Other output devices include sensory devices that may emit sound, light, or physical vibration. For example, the microprocessor 51 may also send the second output signal to an LED light 42, causing it to illuminate or flash when the door is being closed, or in other defined positions. In this or other embodiments, the microprocessor may send a signal to an output device 43 to emit an audible alert for a period of time preceding any secondary action (e.g., closing the door as hereinabove described) the system of the disclosed technology undertakes. Likewise, the microprocessor 51 may send the second output signal to a food storage unit 44, which may then dispense food therefrom. This will allow Pavlovian conditioning to be used in association with the system of the disclosed technology. These output signals may be communicated individually to one or more output devices, such as shown in FIG. 5, or may also be communicated in series or in parallel to one or more output devices, as shown in FIG. 6. As shown in FIGS. 5 and 6, some or all of the output devices may have an independent control to operate whether they are on or off (receiving signals or not), such as for example a bypass switch. In some embodiments, the limit switches communicate with the microprocessor to affect actions on output devices, such as the LED, to delay action of the output device until a certain condition is sensed by one or more of the limit switches; in other embodiments the microprocessor delays sending the signal to the output device until the condition is met (e.g., a signal to turn on or off a light may be sent to the LED once the respective limit switch senses the door is closed or open).

An example of programming logic which may be used in embodiments of the disclosed technology may function as follows, wherein multiple input signals are received by the microprocessor, and one or more limit switches communicate to the microprocessor the position of a door:

| Input Device | Input Signal | Door Position | Microprocessor output signals |
| --- | --- | --- | --- |
| Smart Switch | off to on | Closed | To Sound - alert for 30 sec To Actuator - open To LED - off (after door opens) |
| Smart Switch | on to off | Open | To Sound - alert for 30 sec To Actuator - close To LED - on (after close) |
| Smart Switch | off to on | Open | No Action |
| Smart Switch | on to off | Closed | No Action |
| Light Sensor | >20% max value | Closed | To Sound - alert for 30 sec To Actuator - delay 10 min, open To LED - delay 10 min, off (after open) |
| Light Sensor | <10% max value | Open | To Sound - alert for 30 sec To Actuator - delay 10 min, close To LED - delay 10 min, on (after close) |
| Light Sensor | >20% max value | Open | No Action |
| Light Sensor | <10% max value | Closed | No Action |
| Light Sensor | <20% & >10% max value | Open | No Action |
| Light Sensor | <20% & >10% max value | Closed | No Action |
| Manual Switch | off to 1$^{st}$ direction | Closed | To Sound - 30 sec alert To Actuator - open To LED - off (after open) |
| Manual Switch | off to 2$^{nd}$ direction | Open | To Sound - 30 second alert To Actuator - close To LED - on (after close) |
| Manual Switch | 1$^{st}$ direction to off | Closed | No Action |
| Manual Switch | 2$^{nd}$ direction to off | Open | No Action |
| Manual Switch | off to 1$^{st}$ direction | Open | No Action |
| Manual Switch | Off to 2$^{nd}$ direction | Closed | No Action |

As hereinabove discussed, in the exemplary embodiment shown in FIGS. 1-4, a door to a chicken coop is provided with the technology herein described to control various output devices. In this embodiment, a housing 1 supports many of the components of the system. FIG. 1 shows the interior side of the housing, with a Pavlovian programmable feeder 44 positioned on the upper exterior surface of the housing. A light 42 and a device capable of making sounds 43, and a manual switch input device 31 are supported on the underside of a crossbar of the housing. The door 2, which moves up and down as controlled by the system of the disclosed technology is positioned on a second end of the housing.

FIG. 2 shows the same embodiment, with a cover of the housing removed, to show the circuit board 5, the microprocessor 51, limit switches 61, the actuator 41 as coupled with the door, and a smart switch 32. FIG. 3 is a side view of this embodiment of the disclosed technology, further showing the light sensor 33 positioned on the top of the housing 1. As shown, lower limit switch 61 is moved by the door, and with upper limit switch 61 communicates the position of the door to the microprocessor. FIG. 4 provides a view of the back of this embodiment of the disclosed technology.

In this embodiment, as shown in FIG. 5, the inputs to the system include a manual input, with three wires in communication with the circuit board, a light sensor, a smart switch, and an expansion port for a fourth input. The microprocessor controls four output devices, which may include a Pavlovian food dispenser, an actuator coupled with the door, a light and sound (which also is designed in a Pavlovian manner). The food, light and sound output devices and the light sensor input may each have a bypass switch so that the user may disable any of these devices. Two limit switches are provided to communicate the position of the door to the microprocessor.

Another diagram useful for understanding the flow of signals in this exemplary embodiment is shown in FIG. 6. In this embodiment, the microprocessor communicates directly with the light output device and a second expansion output device. Further, the microprocessor, upon intention to move the actuator, first sends the signal to an alert switch which, if on, generates a Pavlovian alert, such as sound or food, and transmits the signal to the actuator, which operates the apparatus (e.g., opens/closes the door). If on, a delay switch may delay the transmission of the signal to the actuator for period of time (x).

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

The invention claimed is:

1. A system for controlling movement of a door to provide and restrict access to a chicken coop, the system comprising a plurality of input devices, a plurality of output devices, and a microprocessor configured on a circuit board to detect signals from the input devices, process the signals, and based upon predetermined logic generate and transmit output signals to the output devices,
    wherein one of the plurality of input devices is a wireless smart switch remotely controlled by a user, which transmits electric current based upon user input such that when the user input by voice command communicated wirelessly indicates an intention that the door move in a first direction, the switch will transmit electric current, and when the user input by voice command communicated wirelessly indicates an intention that the door move in a second direction, the switch will stop transmitting electric current;
    wherein another of the input devices is a sensor capable of sensing environmental light conditions and transmitting electric current defined by such light conditions;
    wherein another of the input devices is a manual switch, which conducts electric current based upon the position of the switch;
    wherein one of the output devices is a mechanical rotary actuator, coupled with the door of the chicken coop to cause the door to open or close at a pre-determined speed based upon output signals received from the microprocessor, wherein a track directs the position of the door relative to the chicken coop as the door is raised to open or lowered to close, and wherein the microprocessor applies a delay of variable length after detecting a signal from the sensor capable of sensing environmental light conditions before transmitting a signal to the mechanical rotary actuator;
    wherein another of the output devices is a light which illuminates when the door is in or between certain positions;
    wherein another of the output devices is a device that generates a sound based upon output signals received from the microprocessor; and
    wherein the system further comprises one or more limit switches which sense a position of the door to the chicken coop, and communicates the door position to the microprocessor for use by the microprocessor in determining what output signals, if any, to transmit to one or more of the output devices.

2. The system of claim 1, wherein the user remotely controls the wireless smart switch through means of Wi-Fi, cellular, Bluetooth, Z-wave, ZigBee, or radio signals.

3. The system of claim 2, wherein electric current from the smart switch is received at an input terminal on the circuit board, and wherein the circuit board comprises an opto-isolator positioned to detect the current from the smart switch, and when current is detected the opto-isolator relays electrical current to the microprocessor indicating intention that the door move in a first direction.

4. The system of claim 1, wherein the manual switch is a momentary switch in an ON-OFF-ON configuration, which conducts an electrical signal on a first wire coupled with the microprocessor when the manual switch is moved to a first ON position, and conducts an electrical signal on a second wire coupled with the microprocessor when the manual switch is moved to a second ON position.

5. The system of claim 1, wherein a voltage of the electrical current conducted by the sensor is directly proportional to the light sensed by the sensor.

6. The system of claim 1, wherein the microprocessor ignores input signals from the input devices which convey an intention that the door move in the first or second directions to a position when in real time the limit switch communicates to the microprocessor that the door is already in the position.

7. The system of claim 1, wherein the microprocessor delays some of the output signals to one or more of the output devices.

8. A circuit board for controlling multiple apparatuses designed and configured to receive signals from a plurality of input devices, and to be in communication with, direct or control a plurality of output devices, having a microprocessor on the circuit board to detect signals from the input devices, process the signals, and based upon predetermined logic generate and transmit output signals to the output devices useful in the operation thereof,
    wherein one of the plurality of input devices is a wireless smart switch remotely controlled by a user by voice command communicated wirelessly, which based upon user input transmits or does not transmit electric current;
    wherein another of the input devices is a sensor capable of sensing an environmental condition and transmitting electric current defined by such condition;
    wherein another of the input devices is a manual switch, which conducts electric current based upon the position of the switch;
    wherein one of the output devices is a mechanical rotary actuator, coupled with an apparatus, to cause the apparatus to move at a pre-determined speed based upon output signals received from the microprocessor, wherein the apparatus is a door of a chicken coop, and wherein a track directs the position of the door relative to the chicken coop as the door is raised to open or lowered to close, and wherein the microprocessor applies a delay of variable length after detecting a signal from the sensor capable of sensing environmental light conditions before transmitting a signal to the mechanical rotary actuator;

wherein another of the output devices is a light which illuminates when the door is in or between certain positions wherein another of the output devices is a device that generates a sound based upon output signals received from the microprocessor; and wherein the system further comprises one or more limit switches which sense a position of the apparatus, and communicates the apparatus position to the microprocessor for use by the microprocessor in determining what output signals, if any, to transmit to one or more of the output devices.

9. The circuit board of claim 8, wherein the user remotely controls the wireless smart switch through means of Wi-Fi, cellular, Bluetooth, Z-wave, ZigBee, or radio signals.

10. The circuit board of claim 9, wherein electric current from the smart switch is received at an input terminal on the circuit board, and wherein the circuit board comprises an opto-isolator positioned to detect the current from the smart switch, and when current is detected the opto-isolator relays electrical current to the microprocessor.

11. The circuit board of claim 8, wherein the manual switch is a momentary switch in an ON-OFF-ON configuration, which conducts an electrical signal on a first wire coupled with the microprocessor when the manual switch is moved to a first ON position, and conducts an electrical signal on a second wire coupled with the microprocessor when the manual switch is moved to a second ON position.

12. The circuit board of claim 8, wherein the voltage of the electrical current conducted by the sensor is directly proportional to the environmental condition sensed by the sensor.

13. The circuit board of claim 8, wherein the microprocessor ignores input signals from the input devices which convey an intention that the apparatus move in a direction to a position when in real time the limit switch communicates to the microprocessor the apparatus is already in the position.

14. The circuit board of claim 8, wherein the microprocessor delays some of the output signals to one or more of the output devices.

15. A method for controlling the position of a door allowing or restricting access to a chicken coop, the method comprising:

providing a plurality of input devices designed to transmit signals and information to a microprocessor, the input devices including:
a wireless smart switch remotely controlled by a user by voice command communicated wirelessly, which transmits electric current based upon user input such that when the user input indicates an intention that the door move in a first direction, the switch will transmit electric current, and when the user input indicates an intention that the door move in a second direction, the switch will stop transmitting electric current,
a sensor capable of sensing environmental light conditions and transmitting electric current defined by such light conditions, and
a manual switch, which conducts electric current based upon the position of the switch;

providing a plurality of output devices coupled with the microprocessor, which output devices operate based upon output signals from the microprocessor, the output devices including:
a mechanical rotary actuator, coupled with the door of the chicken coop to cause the door to open or close at a pre-determined speed based upon output signals received from the microprocessor, wherein a track directs the position of the door relative to the chicken coop as the door is raised to open or lowered to close, and wherein the microprocessor applies a delay of variable length after detecting a signal from the sensor capable of sensing environmental light conditions before transmitting a signal to the mechanical rotary actuator,
a light which illuminates when the door is in or between certain positions
a device that generates a sound based upon output signals received from the microprocessor;

processing signals received by the microprocessor from one or more of the input devices, and through its predefined logic, generating and transmitting output signals to one or more of the output devices based upon user input, conditions sensed by the sensor, and conditions sensed by one or more limit switches communicating with the microprocessor, at least one of such signals being communicated to the actuator, causing the actuator to move the door in a first or second direction.

16. The method of claim 15, wherein the user remotely controls the wireless smart switch through means of Wi-Fi, cellular, Bluetooth, Z-wave, ZigBee, or radio signals.

17. The method of claim 16, wherein electric current from the smart switch is received at an input terminal on the circuit board, and wherein the circuit board comprises an opto-isolator positioned to detect the current from the smart switch, and when current is detected the opto-isolator relays electrical current to the microprocessor indicating intention that the door move in a first direction.

18. The method of claim 15, wherein the manual switch is a momentary switch in an ON-OFF-ON configuration, which conducts an electrical signal on a first wire coupled with the microprocessor when the manual switch is moved to a first ON position, and conducts an electrical signal on a second wire coupled with the microprocessor when the manual switch is moved to a second ON position.

19. The method of claim 15, wherein the voltage of the electrical current conducted by the sensor is directly proportional to the light sensed by the sensor.

20. The method of claim 15, wherein the microprocessor ignores input signals from the input devices which convey an intention that the door move in the first or second directions to a position when in real time the limit switch communicates to the microprocessor that the door is already in the position.

* * * * *